(12) United States Patent
Cho et al.

(10) Patent No.: US 7,093,052 B2
(45) Date of Patent: Aug. 15, 2006

(54) BUS SAMPLING ON ONE EDGE OF A CLOCK SIGNAL AND DRIVING ON ANOTHER EDGE

(75) Inventors: James Y. Cho, Los Gatos, CA (US); Joseph B. Rowlands, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 96 days.

(21) Appl. No.: 10/715,054

(22) Filed: Nov. 17, 2003

(65) Prior Publication Data

US 2004/0098635 A1 May 20, 2004

Related U.S. Application Data

(63) Continuation of application No. 09/680,523, filed on Oct. 6, 2000, now Pat. No. 6,678,767.

(51) Int. Cl.
G06F 13/14 (2006.01)
(52) U.S. Cl. ............... 710/305; 710/306; 710/240; 713/600
(58) Field of Classification Search .......... 710/107, 710/240–244, 305–306; 713/600
See application file for complete search history.

(56) References Cited

U.S. PATENT DOCUMENTS

| | | | |
|---|---|---|---|
| 5,774,700 A * | 6/1998 | Fisch et al. ........... | 713/500 |
| 5,919,265 A | 7/1999 | Nishtala et al. | |
| 6,067,590 A * | 5/2000 | Pettey et al. .......... | 710/100 |
| 6,078,546 A | 6/2000 | Lee | |
| 6,173,349 B1 | 1/2001 | Qureshi et al. | |
| 6,378,017 B1 * | 4/2002 | Girzon et al. ......... | 710/306 |
| 6,418,491 B1 | 7/2002 | Martin San Juan | |
| 6,442,642 B1 * | 8/2002 | Brooks ................. | 710/305 |
| 6,442,644 B1 | 8/2002 | Gustavson et al. | |
| 2001/0034802 A1 | 10/2001 | Peng et al. | |
| 2002/0147875 A1 * | 10/2002 | Singh et al. .......... | 710/305 |

OTHER PUBLICATIONS

"Power PC 601; RISC Microprocessor User's Manual,"IBM Microelectronics, Power PC, Motorola, Rev.1, 1993, 8 pages.
SiByte; "Target Applications,"http://sibyte.com/mercurian/applications.html, Jan. 15, 2001, 2 pages.

(Continued)

*Primary Examiner*—Khanh Dang
*Assistant Examiner*—Kim T. Huynh
(74) *Attorney, Agent, or Firm*—Garlick Harrison & Markison LLP (57) ABSTRACT

An agent may be coupled to receive a clock signal associated with the bus, and may be configured to drive a signal responsive to a first edge (rising or falling) of the clock signal and to sample signals responsive to the second edge. The sampled signals may be evaluated to allow for the driving of a signal on the next occurring first edge of the clock signal. By using the first edge to drive signals and the second edge to sample signals, the amount of time dedicated for signal propagation may be one half clock cycle. Bandwidth and/or latency may be positively influenced. In some embodiments, protocols which may require multiple clock cycles on other buses may be completed in fewer clock cycles. For example, certain protocols which may require two clock cycles may be completed in one clock cycle. In one specific implementation, for example, arbitration may be completed in one clock cycle. Request signals may be driven responsive to the first edge of the clock signal and sampled responsive to the second edge. The sampled signals may be evaluated to determine an arbitration winner, which may drive the bus responsive to the next occurrence of the first edge.

11 Claims, 6 Drawing Sheets

OTHER PUBLICATIONS

SiByte, "SiByte Technology,"http://sibyte.com/mercurian/technology.htm, Jan. 15, 2001, 3 pages.

SiByte, "The Mercurian Processor,"http://sibyte.com/mercurian, Jan. 15, 2001, 2 pages.

SiByte, "Fact Sheet," SB-1 CPU, Oct. 2000, rev. 0.1, 1 page.

SiByte, "Fact Sheet," SB-1250, Oct. 2000, rev. 0.2, 10 pages.

Stepanian, SiByte, SiByte SB-1 MIPS64 CPU Core, Embedded Processor Forum 2000, Jun. 13, 2000, 15 pages.

Jim Keller, "The Mecurian Processor: A High Performance, Power-Efficient CMP for Networking," Oct. 10, 2000, 22 pages.

Halfhill, "SiByte Reveals 64-Bit Core for NPUs," Microprocessor Report, Jun. 2000, pp. 45-48.

Pentium Pro Family Developer's Manual, vol. 1:Specifications, Chapter 3, pp. 1-25, 1996.

Tom R. Halfhill, "SiByte Reveals 64-Bit Core For NPU's; Independent MIPS64 Design Combines Low Power, High Performance," Microdesign Resources, Jun. 2000, Microprocessor Report, 4 pages.

* cited by examiner

BUS SAMPLING ON ONE EDGE OF A CLOCK SIGNAL AND DRIVING ON ANOTHER EDGE

This application is a continuation of and claims priority to U.S. patent application having an application Ser. No. 09/680,523, filed Oct. 6, 2000, now U.S. Pat. No. 6,678,767 which application is hereby incorporated by reference.

BACKGROUND OF THE INVENTION

1. Field of the Invention

This invention is related to digital systems and, more particularly, to buses within digital systems.

2. Description of the Related Art

A bus is frequently used in digital systems to interconnect a variety of devices included in the digital system. Generally, one or more devices are connected to the bus, and use the bus to communicate with other devices connected to the bus. As used herein, the term "agent" refers to a device which is capable of communicating on the bus. The agent may be a requesting agent if the agent is capable of initiating transactions on the bus and may be a responding agent if the agent is capable of responding to a transaction initiated by a requesting agent. A given agent may be capable of being both a requesting agent and a responding agent. Additionally, a "transaction" is a communication on the bus. The transaction may include an address transfer and optionally a data transfer. Transactions may be read transactions (transfers of data from the responding agent to the requesting agent) and write transactions (transfers of data from the requesting agent to the responding agent). Transactions may further include various coherency commands which may or may not involve a transfer of data.

The bus is a shared resource among the agents, and thus may affect the performance of the agents to the extent that the bus may limit the amount of communication by each agent and the latency of that communication. Generally, a bus may be characterized by latency and bandwidth. The latency may be affected by the amount of time used to arbitrate for the bus and to perform a transaction on the bus. The bandwidth may be affected by the amount of information (e.g. bits or bytes) that may be transmitted per cycle, as well as the amount of time used to perform the transfer. Both latency and bandwidth may be affected by the physical constraints of the bus and the protocol employed by the bus.

For example, many bus protocols require two clock cycles for arbitration: the transmission of the requests for the bus during the first clock cycle and the determination of the grant (and transmittal of the grant, in a central arbitration scheme) during the second clock cycle. The transaction may be initiated by the agent receiving the grant during the third clock cycle. The clock cycles may each be a period of a clock signal associated with the bus. Similarly, most bus protocols are limited in the number of bytes of data which may be transferred per clock cycle (e.g. 8 bytes is typical). Accordingly, transferring a cache block of data (which tends to dominate the transfers performed in modem digital systems) requires multiple clock cycles (e.g. 4 clock cycles for a 32 byte cache block on an 8 byte bus).

SUMMARY OF THE INVENTION

The problems outlined above are in large part solved by a system including one or more agents coupled to a bus. The agent may be coupled to receive a clock signal associated with the bus, and may be configured to drive a signal responsive to a first edge (rising or falling) of the clock signal and to sample signals responsive to the second edge. The sampled signals may be evaluated to allow for the driving of a signal on the next occurring first edge of the clock signal.

By using the first edge to drive signals and the second edge to sample signals, the amount of time dedicated for signal propagation may be one half clock cycle. Bandwidth and/or latency may be positively influenced. In some embodiments, protocols which may require multiple clock cycles on other buses may be completed in fewer clock cycles. For example, certain protocols which may require two clock cycles may be completed in one clock cycle. In one specific implementation, for example, arbitration may be completed in one clock cycle. Request signals may be driven responsive to the first edge of the clock signal and sampled responsive to the second edge. The sampled signals may be evaluated to determine an arbitration winner, which may drive the bus responsive to the next occurrence of the first edge.

In one specific implementation, the data bus may be sized to allow for a single cycle data transfer for even the largest sized data that may be transferred in one transaction. For example, the data bus may be sized to transfer a cache block per clock cycle. In one implementation, the bus and agents may be integrated onto a single integrated circuit. Since the bus is internal to the integrated circuit, it may not be limited by the number of pins which may be available on the integrated circuit. Such an implementation may be particularly suited to a data bus sized to allow single cycle data transfer. Additionally, differential pairs may be used for each signal or a subset of the bus signals. Differential signal may further enhance the frequency at which the bus may operate.

In one particular implementation, the bus may support coherency and out of order data transfers (with respect to the order of the address transfers). The bus may support tagging of address and data phases, for example, to match address and corresponding data phases.

Broadly speaking, a system is contemplated comprising a bus and an agent coupled to the bus and to receive a clock signal for the bus. The clock signal has a rising edge and a falling edge during use. The agent is configured to drive one or more signals on the bus responsive to a first edge of the rising edge or the falling edge, and is further configured to sample a value on the bus responsive to a second edge of the rising edge or the falling edge.

Additionally, a method is contemplated. A value is driven on a bus responsive to a first edge of a rising edge or a falling edge of a clock signal for the bus. A value is sampled from the bus responsive to a second edge of the rising edge or the falling edge.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
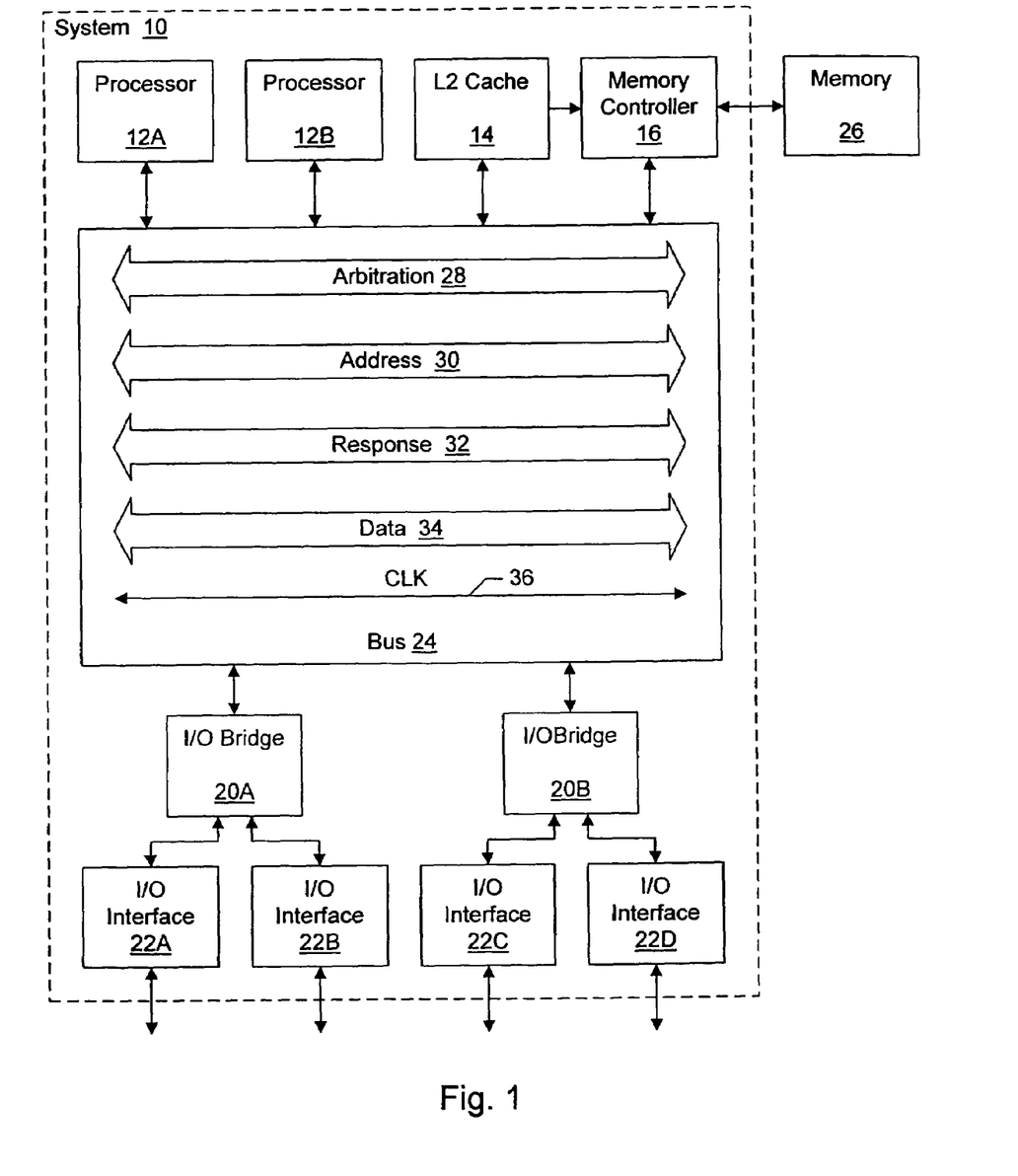
FIG. 1 is a block diagram of one embodiment of a system.

Turning now to FIG. 1, a block diagram of one embodiment of a system 10 is shown. Other embodiments are possible and contemplated. In the embodiment of FIG. 1, system 10 includes processors 12A–12B, an L2 cache 14, a memory controller 16, a pair of input/output (I/O) bridges 20A–20B, and I/O interfaces 22A–22D. System 10 may include a bus 24 for interconnecting the various components of system 10. More particularly, as illustrated in FIG. 1, bus 24 may include arbitration lines 28, an address bus 30, response lines 32, a data bus 34, and a clock line or lines 36. As illustrated in FIG. 1, each of processors 12A–12B, L2 cache 14, memory controller 16, and I/O bridges 20A–20B are coupled to bus 24. Thus, each of processors 12A–12B, L2 cache 14, memory controller 16, and I/O bridges 20A–20B may be an agent on bus 24 for the illustrated embodiment. More particularly, each agent may be coupled to clock line(s) 36 and to the conductors within bus 24 that carry signals which that agent may sample and/or drive. I/O bridge 20A is coupled to I/O interfaces 22A–22B, and I/O bridge 20B is coupled to I/O interfaces 22C–22D. L2 cache 14 is coupled to memory controller 16, which is further coupled to a memory 26.

Bus 24 may be a split transaction bus in the illustrated embodiment. A split transaction bus splits the address and data portions of each transaction and allows the address portion (referred to as the address phase) and the data portion (referred to as the data phase) to proceed independently. In the illustrated embodiment, the address bus 30 and data bus 34 are independently arbitrated for (using signals on arbitration lines 28). Each transaction including both address and data thus includes an arbitration for the address bus 30, an address phase on the address bus 30, an arbitration for the data bus 34, and a data phase on the data bus 34. Additionally, coherent transactions may include a response phase on response lines 32 for communicating coherency information after the address phase. Additional details regarding one embodiment of bus 24 are provided further below. The bus clock signal CLK on clock line(s) 36 defines the clock cycle for bus 24.

Bus 24 may be pipelined. Bus 24 may employ any suitable signalling technique. For example, in one embodiment, differential signalling may be used for high speed signal transmission. Other embodiments may employ any other signalling technique (e.g. TTL, CMOS, GTL, HSTL, etc.).

Processors 12A–12B may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture.

L2 cache 14 is a high speed cache memory. L2 cache 14 is referred to as "L2" since processors 12A–12B may employ internal level 1 ("L1") caches. If L1 caches are not included in processors 12A–12B, L2 cache 14 may be an L1 cache. Furthermore, if multiple levels of caching are included in processors 12A–12B, L2 cache 14 may be an outer level cache than L2. L2 cache 14 may employ any organization, including direct mapped, set associative, and fully associative organizations. In one particular implementation, L2 cache 14 may be a 512 kilobyte, 4 way set associative cache having 32 byte cache lines. A set associative cache is a cache arranged into multiple sets, each set comprising two or more entries. A portion of the address (the "index") is used to select one of the sets (i.e. each encoding of the index selects a different set). The entries in the selected set are eligible to store the cache line accessed by the address. Each of the entries within the set is referred to as a "way" of the set. The portion of the address remaining after removing the index (and the offset within the cache line) is referred to as the "tag", and is stored in each entry to identify the cache line in that entry. The stored tags are compared to the corresponding tag portion of the address of a memory transaction to determine if the memory transaction hits or misses in the cache, and is used to select the way in which the hit is detected (if a hit is detected).

Memory controller 16 is configured to access memory 26 in response to memory transactions received on bus 24. Memory controller 16 receives a hit signal from L2 cache 14, and if a hit is detected in L2 cache 14 for a memory transaction, memory controller 16 does not respond to that memory transaction. If a miss is detected by L2 cache 14, or the memory transaction is non-cacheable, memory controller 16 may access memory 26 to perform the read or write operation. Memory controller 16 may be designed to access any of a variety of types of memory. For example, memory controller 16 may be designed for synchronous dynamic random access memory (SDRAM), and more particularly double data rate (DDR) SDRAM. Alternatively, memory controller 16 may be designed for DRAM, Rambus DRAM (RDRAM), SRAM, or any other suitable memory device.

I/O bridges 20A–20B link one or more I/O interfaces (e.g. I/O interfaces 22A–22B for I/O bridge 20A and I/O interfaces 22C–22D for I/O bridge 20B) to bus 24. I/O bridges 20A–20B may serve to reduce the electrical loading on bus 24 if more than one I/O interface 22A–22B is bridged by that I/O bridge. Generally, I/O bridge 20A performs transactions on bus 24 on behalf of I/O interfaces 22A–22B and relays transactions targeted at an I/O interface 22A–22B from bus 24 to that I/O interface 22A–22B. Similarly, I/O bridge 20B generally performs transactions on bus 24 on behalf of I/O interfaces 22C–22D and relays transactions targeted at an I/O interface 22C–22D from bus 24 to that I/O interface 22C–22D. In one implementation, I/O bridge 20A may be a bridge to a PCI interface (e.g. I/O interface 22A) and to a Lightning Data Transport (LDT) I/O fabric developed by Advanced Micro Devices, Inc (e.g. I/O interface 22B). Other I/O interfaces may be bridged by I/O bridge 20B. Other implementations may bridge any combination of I/O interfaces using any combination of I/O bridges. I/O interfaces 22A–22D may include one or more serial interfaces, Personal Computer Memory Card International Association (PCMCIA) interfaces, Ethernet interfaces (e.g. media access control level interfaces), Peripheral Component Interconnect (PCI) interfaces, LDT interfaces, etc.

It is noted that system 10 (and more particularly processors 12A–12B, L2 cache 14, memory controller 16, I/O interfaces 22A–22D, I/O bridges 20A–20B and bus 24) may be integrated onto a single integrated circuit as a system on a chip configuration. In another configuration, memory 26 may be integrated as well. Alternatively, one or more of the components may be implemented as separate integrated circuits, or all components may be separate integrated circuits, as desired. Any level of integration may be used.

It is noted that, while the illustrated embodiment employs a split transaction bus with separate arbitration for the address and data buses, other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice.

It is noted that, while FIG. 1 illustrates I/O interfaces 22A–22D coupled through I/O bridges 20A–20B to bus 24, other embodiments may include one or more I/O interfaces directly coupled to bus 24, if desired.

Figure 2:
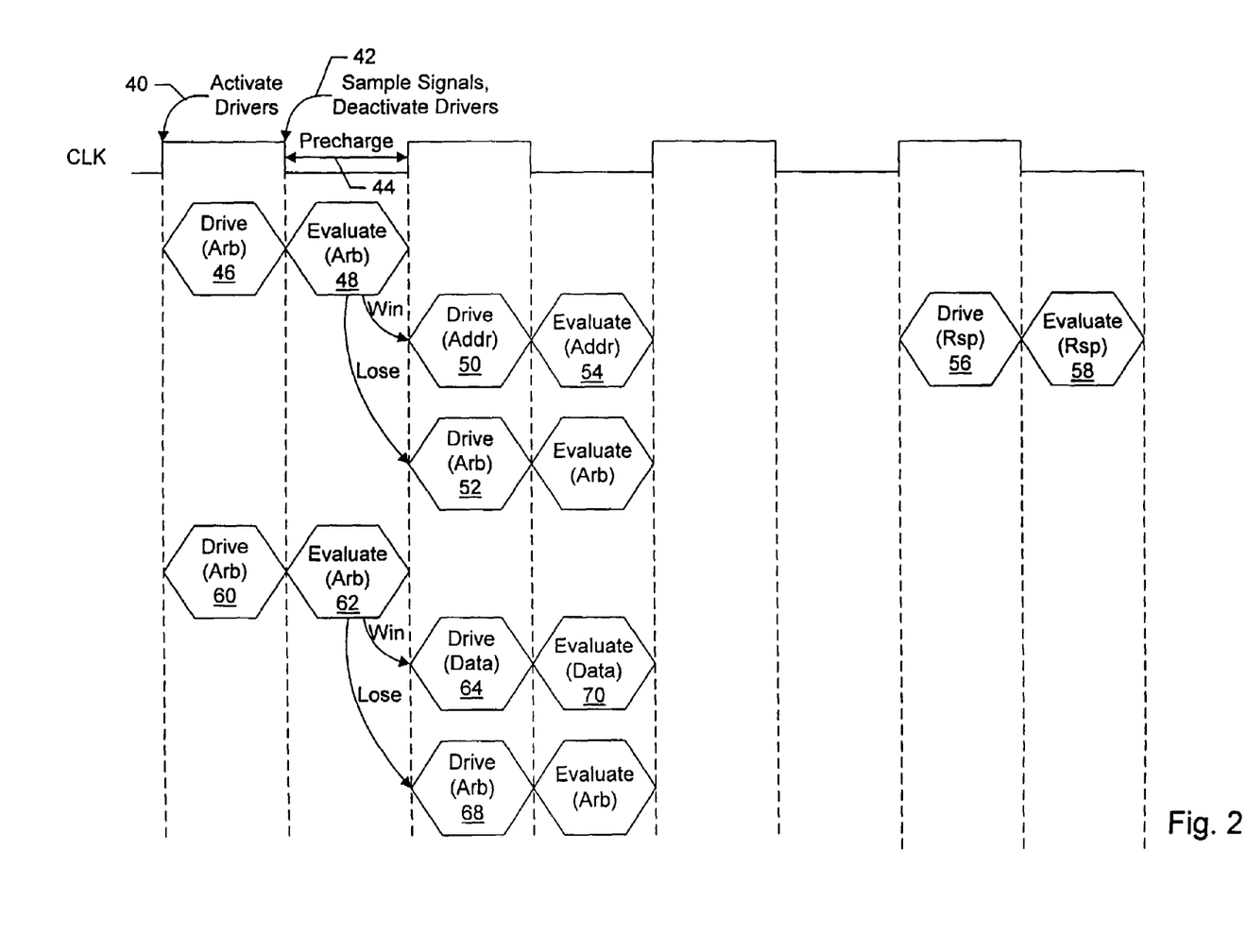
FIG. 2 is a timing diagram illustrating transmission of signals on one embodiment of a bus within the system shown in FIG. 1.

Turning next to FIG. 2, a timing diagram is shown illustrating transmission and sampling of signals according to one embodiment of system 10 and bus 24. Other embodiments are possible and contemplated. The clock signal on clock line(s) 36 is illustrated (CLK) in FIG. 2. The high and low portions of the clock signal CLK are delimited with vertical dashed lines.

Generally, the clock signal CLK may have a rising edge (the transition from a low value to a high value) and a falling edge (the transition from a high value to a low value). The signals on bus 24 may be driven responsive to one of the edges and sampled responsive to the other edge. For example, in the illustrated embodiment, signals may be driven responsive to the rising edge and sampled responsive to the falling edge. Thus, signals propagate on bus 24 during the time between the rising edge and the falling edge of the clock signal, and sampled signals may be evaluated between the falling edge and the rising edge of the clock signal. One or more signals on the bus may be driven with a value, and that value may be sampled by an agent receiving the signals.

More particularly, as illustrated by arrow 40, an agent which has determined that it will drive a signal or signals during a clock cycle may activate its driver for each such signal responsive to the rising edge of the clock signal. For example, an agent may logically AND the clock signal CLK with an internally generated signal indicating that a signal is to be driven to produce an enable signal for a driver on the signal (if the enable signal is asserted high). Other embodiments may employ other logic circuits to produce the enable, depending on whether the enable is asserted high or low and whether the internally generated signal is asserted high or low. Furthermore, the clock signal CLK may be logically ORed with a delayed version of the clock signal CLK to add hold time to avoid race conditions with the sampling of the signal at the falling edge of the clock signal CLK, as desired.

As illustrated by arrow 42, agents may sample signals responsive to the falling edge of the clock signal. For example, agents may employ a senseamp (e.g. for differential signalling), flip flop, register, latch, or other clocked device which receives the clock signal CLK and captures the signal on the line responsive to the falling edge of the clock signal CLK.

In one embodiment, bus 24 may employ differential pairs of lines for each signal. Each line may be precharged, and then one of the lines may be driven to indicate the bit of information transmitted on that line. For such embodiments, the signals may be precharged between the falling edge of the clock signal CLK and the next rising edge of the clock signal CLK (illustrated by arrow 44). Thus, the agent driving the signal may disable its drivers responsive to the falling edge of the clock signal CLK. In one specific implementation, the agent driving the signal may disable its driver after a predetermined delay to avoid a race condition with the sampling of the signals. One of the agents may be defined to perform the precharge, or a separate circuit (not shown) may perform the precharge. Alternatively, the agent driving the signal may perform the precharge.

Since signals are driven responsive to one edge of the clock signal and sampled responsive to the other edge, the latency for performing a transaction may be reduced. Generally, the clock cycle may be divided into a drive phase and an evaluate phase. During the drive phase, signals are driven. Those driven signals are sampled at the end of the drive phase and, during the evaluate phase, those driven signals are evaluated to determine if the sampling agent is to perform an action with respect to the information transmitted.

For example, arbitration may be completed in one clock cycle, according to one embodiment. The request signals for each agent requesting the bus may be driven responsive to the rising edge, and sampled on the falling edge. During the remaining portion of the clock cycle, the request signals may be evaluated to determine a winner of the arbitration. The winner may drive the bus on the next rising edge. As illustrated in FIG. 2, address arbitration request signals may be driven (reference numeral 46) and evaluated (reference numeral 48) in the first illustrated clock cycle. The winning agent may drive an address portion of a transaction during the subsequent clock cycle (reference numeral 50). Other arbitrating agents may determine that they did not win, and thus may drive request signals again during the subsequent clock cycle (reference numeral 52).

Agents involved in coherency may sample the address driven by the winning agent (reference numeral 54). During the evaluate phase, the agents may determine if the transaction is a coherent transaction, and thus that the agents are to snoop the address. Additionally, the evaluate phase and the subsequent clock cycle may be used to determine the snoop result, which may be driven in the response phase (reference numeral 56) and evaluated by the agent driving the address (reference numeral 58).

Data bus arbitration may be similar, as illustrated by reference numerals 60–70. More particularly, data arbitration request signals may be driven (reference numeral 60) and evaluated (reference numeral 62) in the first illustrated clock cycle. The winning agent may drive a data portion of a transaction during the subsequent clock cycle (reference numeral 64). Agents which receive data may sample the data, and may evaluate the data (reference numeral 70). For example, in embodiments which provide tagging to allow for out of order data transfers, the tags may be compared to tags that the agent is awaiting data for to determine if the agent should capture the data. Other arbitrating agents may determine that they did not win, and thus may drive request signals again during the subsequent clock cycle (reference numeral 68).

As used herein, the term "drive", when referring to a signal, refers to activating circuitry which changes the voltage on the line carrying the signal, to thereby transmit a bit of information. The term "sample", when referring to a signal, refers to sensing the voltage on the line carrying the signal to determine the bit of information conveyed on the signal. The term "precharge" refers to setting the voltage on a line to a predetermined value prior to the time that the line may be driven. The predetermined value may be a supply (high) voltage or a ground (low) voltage, for example.

While the above discussion illustrated an example in which signals are driven responsive to the rising edge of the clock signal CLK and sampled responsive to the falling edge, an alternative embodiment is contemplated in which signals may be driven responsive to the falling edge and sampled responsive to the rising edge.

Figure 3:
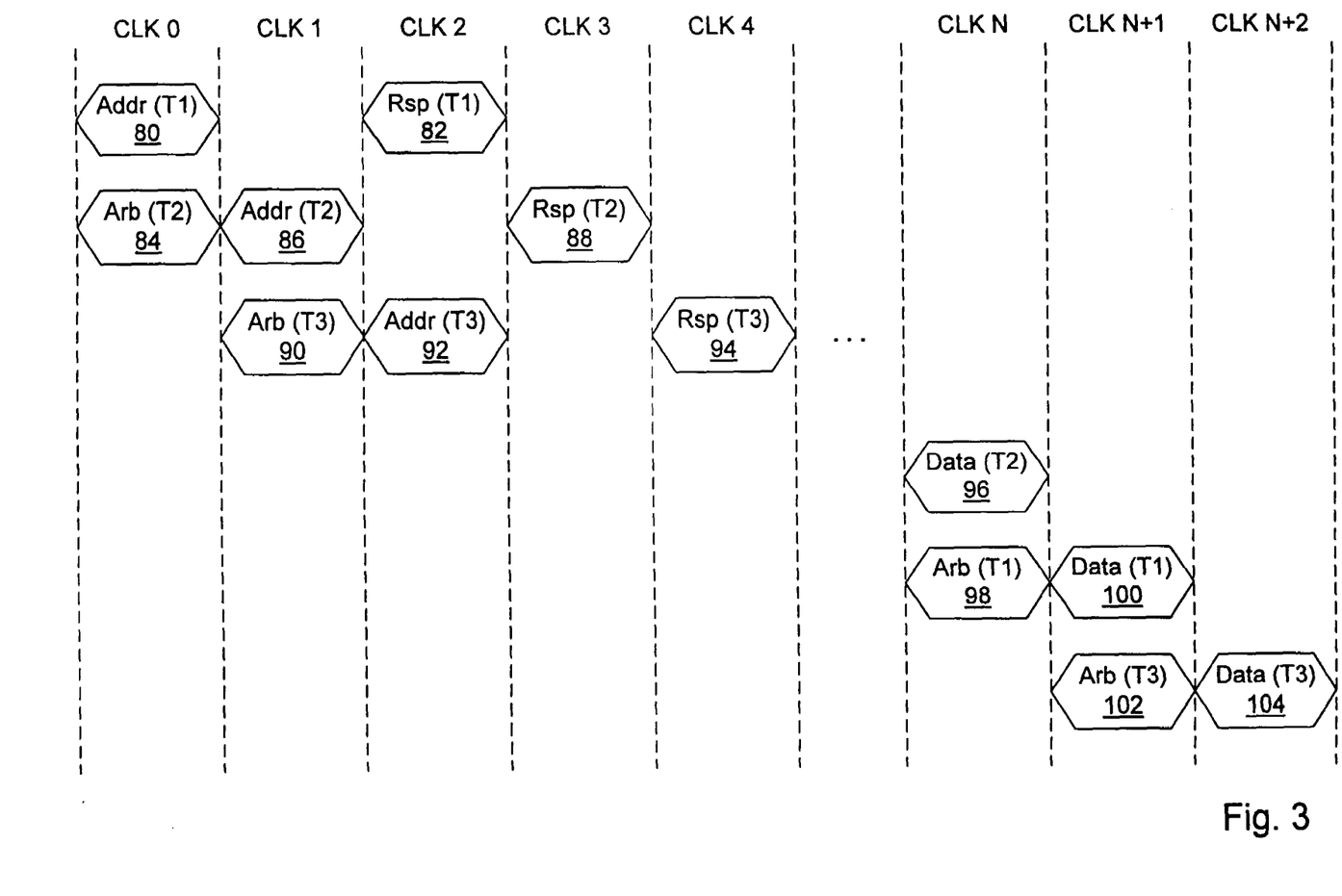
FIG. 3 is a timing diagram illustrating several exemplary bus transactions.

Turning next to FIG. 3, a timing diagram is shown illustrating several exemplary transactions which may be performed on one embodiment of bus 24. Other embodiments are possible and contemplated. In FIG. 3, clock cycles are delimited by vertical dashed lines and labeled (CLK 0, CLK 1, etc.) at the top.

FIG. 3 illustrates pipelining on the bus according to one embodiment of the bus. During clock cycle CLK 0, the address phase of a first transaction (T1) is occurring on the address bus (reference numeral 80). The response phase for the first transaction occurs in clock cycle CLK 2 (reference numeral 82). In parallel with the address phase of the first transaction, during clock cycle CLK 0, arbitration for the address bus is occurring and an agent wins the arbitration to perform a second transaction (T2) (reference numeral 84). The corresponding address phase occurs in clock cycle CLK 1 (reference numeral 86) and the response phase occurs in clock cycle CLK 3 (reference numeral 88). In parallel with the address phase of the second transaction during clock cycle CLK 1, arbitration for the address bus is occurring and an agent wins the arbitration to perform a third transaction (T3) (reference numeral 90). The corresponding address phase occurs in clock cycle CLK 2 (reference numeral 92) and the response phase occurs in clock cycle CLK 4 (reference numeral 94).

Data phases for the transactions are illustrated in clock cycles CLK N, CLK N+1, and CLK N+2. More particularly, the data phase for the second transaction is occurring during clock cycle CLK N (reference numeral 96). In parallel during clock cycle CLK N, an arbitration for the data bus is occurring and an agent wins to perform the data phase of the first transaction (reference numeral 98). The corresponding data phase occurs in clock cycle CLK N+1 (reference numeral 100). In parallel during clock cycle CLK N+1, an arbitration for the data bus is occurring and an agent wins to perform the data phase of the third transaction (reference numeral 102). The corresponding data phase occurs in clock cycle CLK N+2 (reference numeral 104).

Thus, the address arbitration, address phase, response phase, data arbitration, and data phase of various transactions may be pipelined. Accordingly, a new transaction may be initiated each clock cycle, providing high bandwidth. Furthermore, in one embodiment, the data bus width is as wide as the largest data transfer which may occur in response to a single transaction (e.g. a cache block wide, in one embodiment). Therefore, data transfers may occur in a single clock cycle in such an embodiment, again allowing for high bandwidth of one new transaction each clock cycle. Other embodiments may employ a narrower data bus, and may allow address transfers to last more than one clock cycle.

It is noted that, while the data phases of the transactions in FIG. 3 are illustrated at a later time than the address phases, the data phases may overlap with the address phases. In one embodiment, the data phase of a given transaction may begin at any time after the address phase.

FIG. 3 also illustrates the out of order features of one embodiment of bus 24. While the address phases of the three transactions occur in a first order (T1, then T2, then T3), the data phases occur in a different order (T2, then T1, then T3 in this example). By allowing out of order data phases with respect to the order of the corresponding address phases, bandwidth utilization may be high. Each responding agent may arbitrate for the data bus once it has determined that the data is ready to be transferred. Accordingly, other agents (e.g. lower latency agents) may transfer data for later transactions out of order, utilizing bandwidth while the higher latency, but earlier initiated, transaction experiences its latency. Generally, any two transactions may have their data phases performed out of order with their address phases, regardless of whether the two transactions are initiated by the same requesting agent or different requesting agents.

In one embodiment, bus 24 may include tagging for identifying corresponding address phases and data phases. The address phase includes a tag assigned by the requesting agent, and the responding agent may transmit the same tag in the data phase. Thus, the address and data phases may be linked. In one embodiment, the tag assigned to a given transaction may be freed upon transmission of the data, so that the tag may be rapidly reused for subsequent transaction. Queues in the agents receiving data from bus 24 may be designed to capture data using a given tag once per queue entry, to ensure that a reused tag does not overwrite valid data from a previous transaction.

FIG. 3 further illustrates the coherency features of one embodiment of bus 24. Coherency may be maintained using signals transmitted during the response phase of each transaction. The response phase may be fixed in time with respect to the corresponding address phase, and may be the point at which ownership of the data affected by the transaction is transferred. Accordingly, even though the data phases may be performed out of order (even if the transactions are to the same address), the coherency may be established based on the order of the address phases. In the illustrated embodiment, the response phase is two clock cycles of the CLK clock after the corresponding address phase. However, other embodiments may make the fixed interval longer or shorter.

Figure 4:
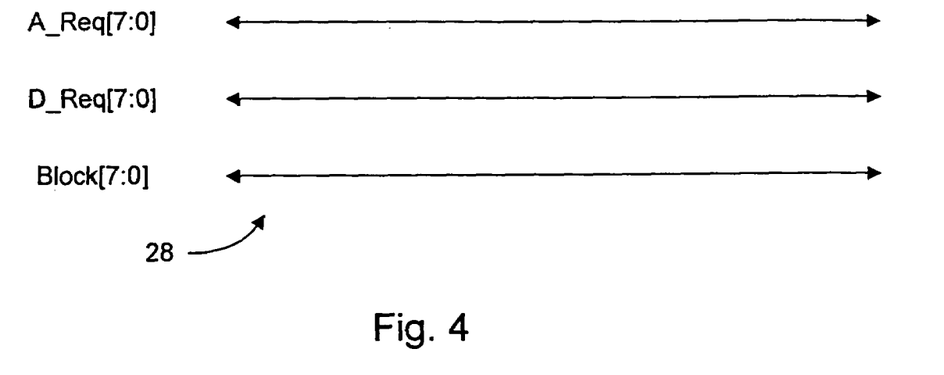
FIG. 4 is a block diagram illustrating exemplary signals which may be included in one embodiment of an arbitration portion of a bus.

Turning next to FIG. 4, a block diagram is shown illustrating exemplary signals which may be included on one embodiment of arbitration lines 28. Other embodiments are possible and contemplated. In the embodiment of FIG. 4, a set of address request signals (A_Req[7:0]) and a set of data request signals (D_Req[7:0]) are included. Additionally, a set of block signals (Block[7:0]) may be included.

The address request signals may be used by each requesting agent to arbitrate for the address bus. Each requesting agent may be assigned one of the address request signals, and that requesting agent may assert its address request signal to arbitrate for the address bus. In the illustrated embodiment, bus 24 may include a distributed arbitration scheme in which each requesting agent may include or be coupled to an arbiter circuit. The arbiter circuit may receive the address request signals, determine if the requesting agent wins the arbitration based on any suitable arbitration scheme, and indicate a grant or lack thereof to the requesting agent. In one embodiment, each arbiter circuit may track the relative priority of other agents to the requesting agent, and may update the priority based on the winning agent (as indicated by an agent identifier portion of the tag transmitted during the address phase).

The data request signals may be used by each responding agent to arbitrate for the data bus. Each responding agent may be assigned one of the data request signals, and that responding agent may assert its data request signal to arbitrate for the data bus. In the illustrated embodiment, bus 24 may include a distributed arbitration scheme in which each responding agent may include or be coupled to an arbiter circuit. The arbiter circuit may receive the data request signals, determine if the responding agent wins the arbitration based on any suitable arbitration scheme, and indicate a grant or lack thereof to the responding agent. In one embodiment, each arbiter circuit may track the relative priority of other agents to the responding agent, and may update the priority based on the winning agent (as indicated by an agent identifier transmitted during the data phase).

The block signals may be used by agents to indicate a lack of ability to participate in any new transactions (e.g. due to queue fullness within that agent). If an agent cannot accept new transactions, it may assert its block signal. Requesting agents may receive the block signals, and may inhibit initiating a transaction in which that agent participates responsive to the block signal. A transaction in which that agent does not participate may be initiated.

Other embodiments may employ a centralized arbitration scheme. Such an embodiment may include address grant signals for each requesting agent and data grant signals for each responding agent, to be asserted by the central arbiter to the winning agent to indicate grant of the bus to that requesting or responding agent.

Figure 5:
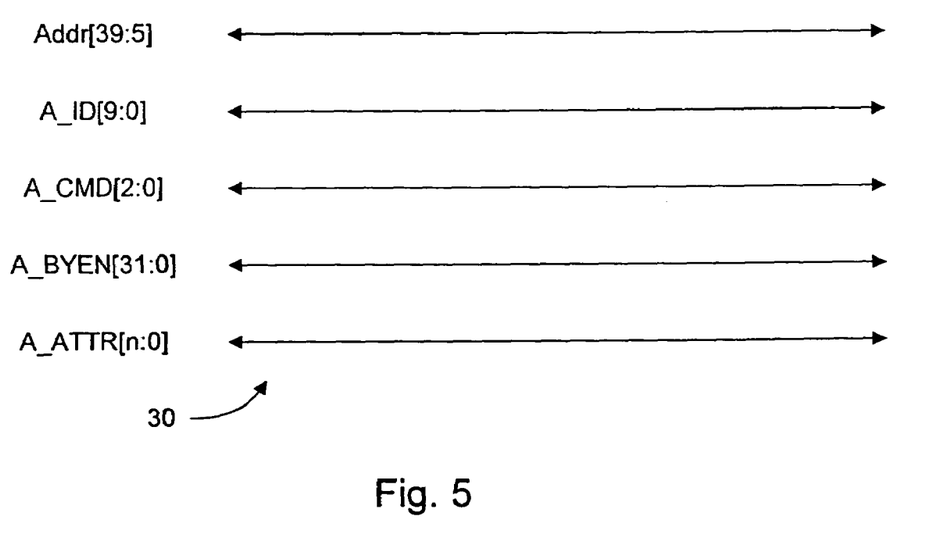
FIG. 5 is a block diagram illustrating exemplary signals which may be included in one embodiment of an address bus.

Turning next to FIG. 5, a block diagram illustrating exemplary signals which may be included on address bus 30 is shown. Other embodiments are possible and contemplated. In the illustrated embodiment, address bus 30 includes address lines used to provide the address of the transaction (Addr[39:5]) and a set of byte enables (A_BYEN [31:0]) indicating which bytes on the data bus 34 are being read or written during the transaction, a command (A_CMD [2:0]) used to indicate the transaction to be performed (read, write, etc.), a transaction ID (A_ID[9:0]) used to identify the transaction, and a set of attributes (A_ATTR[n:0]).

The transaction ID may be used to link the address and data phases of the transaction. More particularly, the responding agent may use the value provided on the transaction ID as the transaction ID for the data phase. Accordingly, the transaction ID may be a tag for the transaction. A portion of the transaction ID is an agent identifier identifying the requesting agent. For example, the agent identifier may be bits 9:6 of the transaction ID. Each agent is assigned a different agent identifier.

The set of attributes may include any set of additional attributes that it may be desirable to transmit in the address phase. For example, the attributes may include a cacheability indicator indicating whether or not the transaction is cacheable within the requesting agent, a coherency indicator indicating whether or not the transaction is to be performed coherently, and a cacheability indicator for L2 cache 14. Other embodiments may employ more, fewer, or other attributes, as desired.

Figure 6:
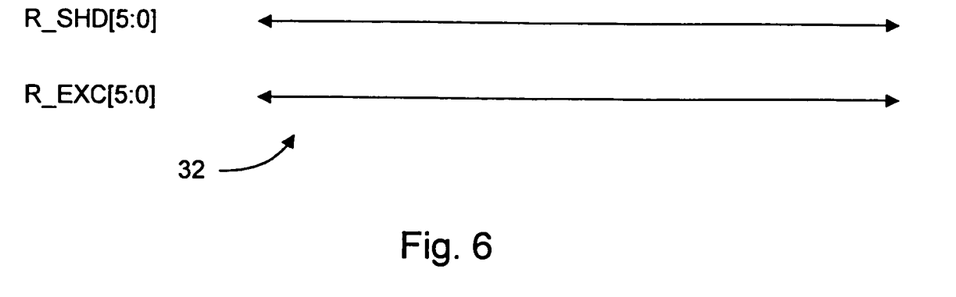
FIG. 6 is a block diagram illustrating exemplary signals which may be included in one embodiment of an response portion of a bus.

Turning next to FIG. 6, a block diagram illustrating exemplary signals which may be employed on one embodiment of response lines 32 is shown. Other embodiments are possible and contemplated. In the embodiment of FIG. 6, response lines 32 include a set of shared signals (R_SHD [5:0]) and a set of exclusive signals (R_EXC[5:0]). Each agent which participates in coherency may be assigned a corresponding one of the set of shared signals and a corresponding one of the set of exclusive signals. The agent may report shared ownership of the data affected by a transaction by asserting its shared signal. The agent may report exclusive ownership of the data affected by a transaction by asserting its exclusive signal. The agent may report no ownership of the data by not asserting other signal. In the illustrated embodiment, modified ownership is treated as exclusive. Other embodiments may employ a modified signal (or an encoding of signals) to indicate modified.

Figure 7:
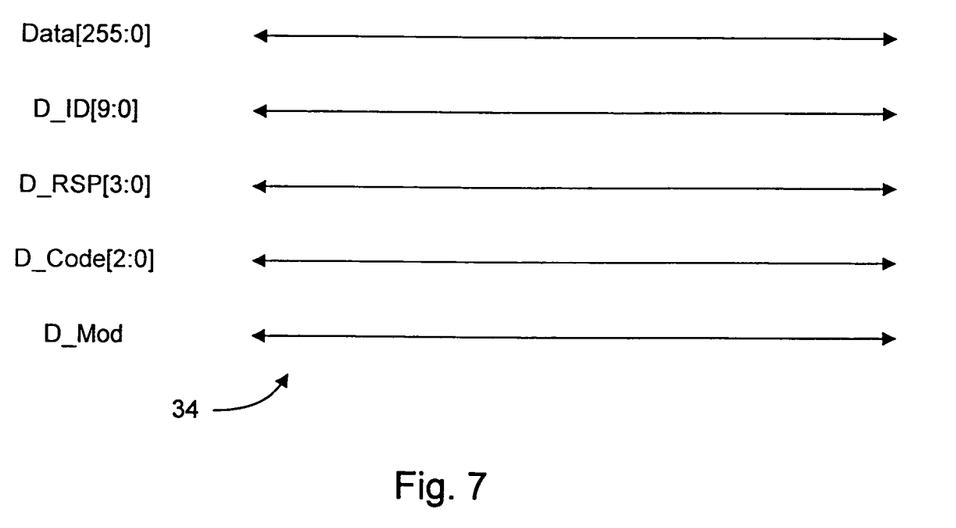
FIG. 7 is a block diagram illustrating exemplary signals which may be included in one embodiment of a data bus.

Turning next to FIG. 7, a block diagram illustrating exemplary signals which may be employed on one embodiment of data bus 34 is shown. Other embodiments are possible and contemplated. In the embodiment of FIG. 7, data bus 34 includes data lines (Data[255:0]) used to transfer the data, a transaction ID (D_ID[9:0]) similar to the transaction ID of the address phase and used to match the address phase with the corresponding data phase, a responder ID (D_RSP[3:0]), a data code (D_Code[2:0]), and a modified signal (D_Mod).

The responder ID is the agent identifier of the responding agent who arbitrated for the data bus to perform the data transfer, and may be used by the data bus arbiter circuits to update arbitration priority state (i.e. the responder ID may be an indication of the data bus arbitration winner). The data code may be used to report various errors with the transaction (e.g. single or double bit error checking and correction (ECC) errors, for embodiments employing ECC, unrecognized addresses, etc.). The modified signal (D_Mod) may be used to indicate, if an agent reported exclusive status, whether or not the data was modified. In one embodiment, an agent which reports exclusive status supplies the data, and the modified indication along with the data.

It is noted that, while various bit ranges for signals are illustrated in FIGS. 4–7, the bit ranges may be varied in other embodiments. The number of request signals, the size of the agent identifier and transaction ID, the size of the address bus, the size of the data bus, etc., may all be varied according to design choice.

Figure 8:
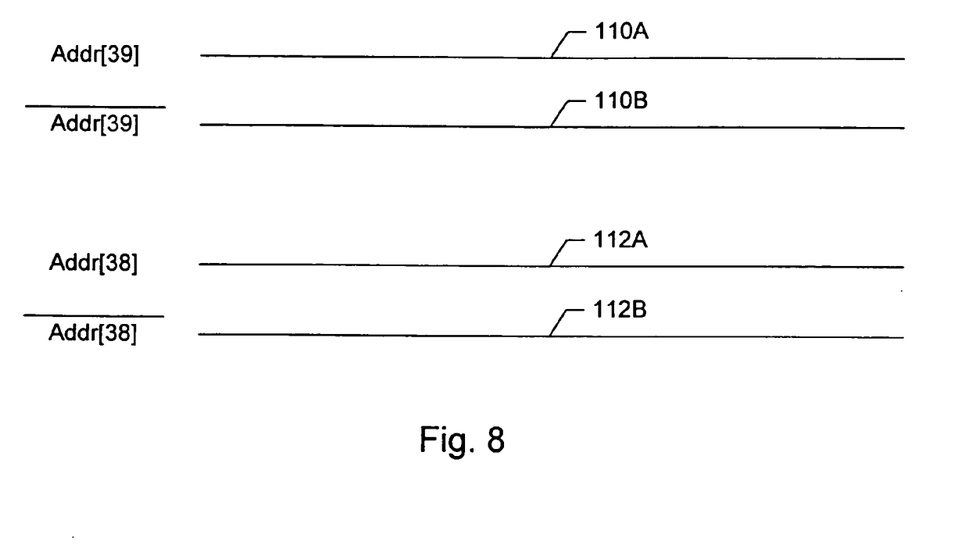
FIG. 8 is a block diagram illustrating differential pairs of signals which may be used in one embodiment of a bus.

Turning next to FIG. 8, a block diagram is shown illustrating differential pairs of signals which may be used according to one embodiment of bus 24. Other embodiments are possible and contemplated. Two bits of the address lines (Addr[39] and Addr[38]) are shown in FIG. 8. Each signal on bus 24 may be differential, in one embodiment. Other embodiments may use differential pairs for any subset of the signals on bus 24, or no signals may be differential pairs.

In the illustrated example, differential pair of lines 110A and 110B are used to transmit Addr[39] and differential pair of lines 112A and 112B are used to transmit Addr[38]. Lines 11A–11B will be discussed, and lines 112A–112B may be used similarly (as well as other differential pairs corresponding to other signals).

Lines 110A–110B may be precharged during the precharge time illustrated in FIG. 2. For example. Lines 110A–110B may be precharged to a high voltage. One of lines 110A–110B may be driven low based on the value of Addr[39] desired by the driving agent. If Addr[39] is to transmit a logical one, line 110A may be driven low. If Addr[39] is to transmit a logical zero, line 110B may be driven low. Receiving agents may detect the difference between lines 110A–110B to determine the value driven on Addr[39] for the transaction. Alternatively, lines 110A–110B may be precharged to a low voltage and one of the lines 110A–110B may be driven high based on the value of Addr[39] desired by the driving agent.

Figure 9:
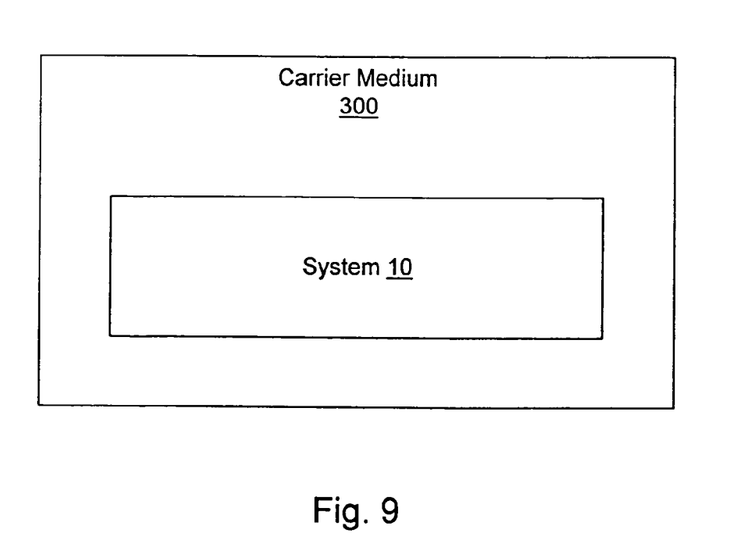
FIG. 9 is a block diagram of a carrier medium.

Turning next to FIG. 9, a block diagram of a carrier medium 300 including a database representative of system 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the database of system 10 carried on carrier medium 300 may be a database which can be read by a program and used, directly or indirectly, to fabricate the hardware comprising system 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising system 10. The netlist may then be placed and routed to produce a data set describing geometric shapes to be applied to masks. The masks may then be used in various semiconductor fabrication steps to produce a semiconductor circuit or circuits corresponding to system 10. Alternatively, the database on carrier medium 300 may be the netlist (with or without the synthesis library) or the data set, as desired.

While carrier medium 300 carries a representation of system 10, other embodiments may carry a representation of any portion of system 10, as desired, including any set of one or more agents (e.g. processors, L2 cache, memory controller, etc.) or circuitry therein (e.g. arbiters, etc.), bus 24, etc.

Numerous variations and modifications will become apparent to those skilled in the art once the above disclosure is fully appreciated. It is intended that the following claims be interpreted to embrace all such variations and modifications.

What is claimed is:

1. An integrated circuit comprising:
    a bus; and
    a plurality of devices coupled to the bus in which individual devices include respective agents coupled to the bus to receive a clock signal having a rising edge and a falling edge, the agents to drive an arbitration signal onto the bus responsive to one of the rising or falling edge and to sample the arbitration signal on the bus responsive to other of the falling or rising edge and to evaluate the arbitration prior to a subseciuent cycle of the clock cycle to allow one agent to request and win arbitration of the bus in one clock cycle, the one agent winning arbitration to drive an address of a transaction responsive to one of the rising or falling edge of the subsequent clock cycle and agents involved in coherency to sample and evaluate the address responsive to other of the falling or rising edge of the subsequent clock cycle and to respond with coherent response signals on the bus at a fixed number of clock cycle or cycles after the address to maintain order for coherency, but in which data driven onto the bus in response to the address need not be maintained at a fixed number of clock cycle or cycles after the address to allow data to be driven out of order on the bus.

2. The integrated circuit of claim 1, wherein the plurality of agents are disposed in the individual devices to perform as distributed agents in a distributed arbitration scheme.

3. The integrated circuit of claim 2, wherein the plurality of devices include a processor, cache memory, memory controller and input/output (I/O) interface, wherein agents within the processor, cache memory, memory controller and I/O interface drive and sample signals on the bus responsive to rising or falling edges of the clock signal.

4. The integrated circuit of claim 3, wherein tags are placed and used to identify corresponding data to the address.

5. The integrated circuit of claim 3, wherein the agents to drive the bus responsive to the rising edge and to sample responsive to the falling edge.

6. The integrated circuit of claim 3, wherein the agents to drive the bus responsive to the falling edge and to sample responsive to the rising edge.

7. A method comprising:
    driving arbitration signals on a bus of an integrated circuit having a plurality of devices coupled to the bus, in which individual devices include respective agents coupled to the bus to receive a clock signal having a rising edge and a falling edge, wherein the arbitration signals are driven onto the bus responsive to one of the rising or falling edge;
    sampling the arbitration signals responsive to other of the falling or rising edge;
    evaluating the arbitration signal prior to a subsequent cycle of the clock cycle to allow one agent to request and win arbitration of the bus in one clock cycle;
    driving an address of a transaction responsive to one of the rising or falling edge of the subsequent clock cycle by the one agent winning arbitration of the bus;
    sampling and evaluating the address responsive to other of the falling or rising edge of the subsequent clock cycle by agents involved in coherency;
    responding with coherent response signals on the bus at a fixed number of clock cycle or cycles after the address by the agents involved in coherency to maintain order for coherency; and
    driving data onto the bus in response to the address without maintaining fixed number of clock cycle or cycles after the address to allow data to be driven out of order on the bus.

8. The method of claim 7, further comprising performing the driving and sampling on a plurality of agents that are distributed in a distributed arbitration scheme.

9. The method of claim 8, further comprising tagging address and data to identify corresponding address and data when data is driven out of order onto the bus.

10. The method of claim 8, wherein the driving is responsive to the rising edge and sampling is responsive to the falling edge.

11. The method of claim 8, wherein the driving is responsive to the falling edge and sampling is responsive to the rising edge.

* * * * *

UNITED STATES PATENT AND TRADEMARK OFFICE
CERTIFICATE OF CORRECTION

| | |
|---|---|
| PATENT NO. | : 7,093,052 B2 |
| APPLICATION NO. | : 10/715054 |
| DATED | : August 15, 2006 |
| INVENTOR(S) | : James Cho et al. |

It is certified that error appears in the above-identified patent and that said Letters Patent is hereby corrected as shown below:

Column 11, line 53, in Claim 1: replace "subseciuent" with --subsequent--.

Signed and Sealed this

Twenty-fourth Day of February, 2009

JOHN DOLL
*Acting Director of the United States Patent and Trademark Office*